United States Patent [19]
Ueno et al.

[11] Patent Number: 5,743,463
[45] Date of Patent: Apr. 28, 1998

[54] AUTOMATIC WATER COMBINATION FAUCET

[75] Inventors: Yuseki Ueno; Shigeru Iwai; Katsumi Matsuzawa, all of Tokyo, Japan

[73] Assignee: NTC Kogyo Kabushiki Kaisha, Tokyo, Japan

[21] Appl. No.: 792,399

[22] Filed: Feb. 3, 1997

Related U.S. Application Data

[63] Continuation of Ser. No. 502,145, Jul. 13, 1995, abandoned.

[30] Foreign Application Priority Data

| Dec. 21, 1994 | [JP] | Japan | 6-335823 |
| Dec. 28, 1994 | [JP] | Japan | 6-338852 |
| Feb. 15, 1995 | [JP] | Japan | 7-050545 |

[51] Int. Cl.⁶ .................................... G05D 23/13
[52] U.S. Cl. ........................... 236/12.2; 236/12.23
[58] Field of Search ....................... 236/12.2–12.23

[56] References Cited

U.S. PATENT DOCUMENTS

| 3,276,691 | 10/1966 | Honegger et al. | 236/12.2 |
| 3,388,861 | 6/1968 | Harding | 236/12.2 |
| 3,792,812 | 2/1974 | Knapp | 236/12.2 |
| 3,929,283 | 12/1975 | Delpla | 236/12.2 |
| 4,029,256 | 6/1977 | Dauga | 236/12.2 |
| 4,607,788 | 8/1986 | Bendall et al. | 236/12.2 |
| 5,340,018 | 8/1994 | MacDonald | 236/12.2 |

FOREIGN PATENT DOCUMENTS

| 63-17903 | 5/1988 | Japan . |
| 6-307567 | 11/1994 | Japan . |

*Primary Examiner*—William E. Tapolcai
*Attorney, Agent, or Firm*—Browdy and Neimark

[57] ABSTRACT

The body of an automatic water combination faucet has, as separate parts, an outer cylinder with the cylindrical wall thereof having assembling hole portions for assembling connectors connected to the hot water, water and combination water lines and an inner cylinder housing accommodating a mixing valve unit. The inner cylinder housing is formed by casting or the like, and has, as integral and continuous parts, a main portion accommodating the mixing valve unit, a passage-defining portion in the form of a line for leading hot water to the main portion, and a passage-defining portion in the form of a duct line for leading out combination water. A separate cap which surrounds an adjustment screw unit of the mixing valve unit is engagedly coupled to the main portion. The passage-defining portions of the inner cylinder housing have respective open ends, which can be aligned, with the inner cylinder housing fitted in the outer cylinder, to the hot water lead-in and combination water lead-out assembling hole portions in an abutting relation thereto. The peripheral wall of the main portion has an opening for leading in water.

2 Claims, 17 Drawing Sheets

AUTOMATIC WATER COMBINATION FAUCET

This application is a continuation of application Ser. No. 08/502,145, filed Jul. 13, 1995, now abandoned.

BACKGROUND OF THE INVENTION

1. Field of the Invention

This invention relates to improvements in an automatic water combination faucet, which serves to combine hot water with water in a ratio controlled as desired and thus provide combination water at a desired temperature.

2. Description of the Prior Art

An automatic water combination faucet is constructed to combine hot water at a comparatively high temperature, which is heated in a boiler or like water heater and then supplied through a hot water supply line, with water which is supplied from a supply water faucet or like water supply source through a water supply line, in a ratio corresponding to a predetermined temperature selected as desired, and thus discharge combination water at the desired predetermined temperature. In the body of the faucet, three passages are formed, i.e., a passage for leading hot water, a passage for leading water and a passage for leading combination water. The outer surface side of the faucet body is provided with connection openings for connecting respective lines to the respective three passages noted above.

Japanese Utility Model Publication No. 63-17903 has disclosed means which, for facilitating the formation of the above three passages in the body of the automatic water combination faucet, forms the faucet body into a double-wall tubular body with two tubular members such as to permit selection of a free position of one of the three connection openings, i.e., the connection opening for leading in hot water, the connection opening for leading in water and the connection opening for leading out combination water.

However, in the disclosed means for freely selecting the position of one of the three connection openings, i.e., the connection opening for leading in hot water, the connection opening for leading in water and the connection opening for leading out combination water, a double-wall structure is formed with an inner cylinder of a water-tight tubular material and an outer cylinder of a tubular material, and the opposite ends of the outer cylinder are closed water-tight, thus forming a water-tight jacket between the two cylinders for utilizing the jacket for any of the passages for hot water, water and combination water. With this structure, it is very cumbersome to make the inner and outer cylinders of the tubular materials water-tight. In addition, in the case where the jacket is allotted to any one of the three passages for hot water, water and combination water, the connection of the remaining two passages is difficult. A further difficulty is encountered in the assembling of a mixing function unit constituted by a mixing valve mechanism and thermo-mechanism into the form of a cartridge which can be detachably inserted in the inner cylinder. The mixing valve mechanism serves to change the ratio of hot water and water as desired. The thermo-mechanism can cause automatic operation of the mixing valve mechanism according to a temperature that is set as desired. A still further difficulty is encountered in the machining of the inner surface of the inner cylinder in order to permit smooth insertion of the assembled mixing function unit into the inner cylinder.

It may be though to form that faucet body not from tubular materials but as a one-piece casting having inner and outer cylinders integral with each other. This formation, however, is extremely cumbersome because of complicated inner shape of the faucet body.

Accordingly, it has been proposed, as disclosed in Japanese Patent Laid-open Publication No. 6-307567, a structure, in which an inner cylinder for accommodating a mixing valve unit is formed by a synthetic resin molding, a jacket which is defined between this inner cylinder and a surrounding outer cylinder is partitioned by partitioning walls formed on the outer periphery of the inner cylinder, and water-tight members are interposed between the partitioning walls and the inner periphery of the outer cylinder. Thus, passages for hot water, water and combination water are formed as isolated water-tight passages in the jacket. Connection openings communicating with these passages are formed in the outer cylinder, and lines for leading in hot water, leading in water and leading out combination water are connected to these connection openings.

According to the Japanese Patent Laid-open Publication No. 6-307567 as noted above, the jacket defined between the outer and inner cylinders is divided by the partitioning walls form provided on the outer periphery of the inner cylinder to the plurality of passages. In this case, it is possible to divide the jacket in the circumferential direction as well by forming the partitioning walls such as to extend in the axial direction of the inner cylinder and be parallel to one another at predetermined intervals in the circumferential direction of the inner cylinder. It is thus possible to divide the jacket to obtain a large number of passages as desired. However, the individual passages formed by the partitioning walls are made water-tight by the water-tight members which are interposed between the outer edges of the partitioning walls and the inner periphery of the outer cylinder. This poses a problem that the assembling of the water-tight members may be cumbersome. In addition, it is difficult to assemble and secure the inner cylinder with the mixing valve unit assembled therein to the outer cylinder by inserting the inner cylinder thereinto. Particularly, it is difficult to assemble and secure the inner cylinder to the outer cylinder by positioning the connection opening in the outer periphery of the outer cylinder to be in accurate communication with the respective passages. As an alternative, it may be thought to form the connection openings on the inner cylinder side such that they project outward through openings formed in the outer cylinder. This structure, however, dictates cumbersome process fabrication. In addition, it is difficult to maintain water tightness of the connection portions.

SUMMARY OF THE INVENTION

The present invention has been intended in order to solve the problems inherent in the prior art means as described. It is an object of the present invention to provide a novel means of automatic water combination faucet, in which the body of the faucet comprises as separately formed parts, an outer cylinder having assembling hole portions for connection of hot water, water and combination water lines and an inner cylinder housing with a mixing valve unit fitted therein, the inner cylinder housing being inserted into the outer cylinder to be assembled and secured to the same, and which permits reliably maintaining the water tightness of the hot water, water and combination water passages and connecting parts of assembling hole portions with respect to the respective passages, permits the assembling of the inner cylinder housing and the outer cylinder to be made reliably with a simple structure, and permits extreme simplification of its fabrication and assembling.

As means for attaining the above object, according to the present invention, there is provided an automatic water combination faucet, in which the body of automatic water combination faucet comprises, as separate parts, an outer cylinder with the cylindrical wall thereof having assembling hole portions connected to connectors for connecting hot water and water lines and a further assembling hole portion connected to a connector for connecting a combination water outlet, and an inner cylinder housing with a mixing valve unit fitted therein, the inner cylinder housing being formed by casting or like means and having, as integral portions, a main portion accommodating the mixing valve unit, a passage-defining portion in the form of a line for leading hot water to the main portion and a passage-defining portion in the form of a line for leading out combination water, the passage-defining portions having open ends abutting the assembling hole portion for leading in hot water and the assembling hole portion for leading out combination water, respectively, in the state that the inner cylinder housing is fitted in the outer cylinder, the peripheral wall of the main portion having an opening for leading in water. Also, there is provided an automatic water combination faucet, in which the body of automatic water combination faucet comprises, as separate parts, an outer cylinder with the cylindrical wall thereof having assembling hole portions connected to connectors for connecting hot water and water lines, respectively, and a further assembling hole portion connected to a connector for connecting a combination water outlet, and an inner cylinder housing with a mixing valve unit fitted therein, the inner cylinder housing being formed by casting or like means and having, as integral portions, a main portion accommodating the mixing valve unit, a passage-defining portion in the form of a line for leading hot water to the main portion and a passage-defining portion in the form of a line for leading in water, the passage-defining portions having open ends abutting the assembling hole portions for leading in hot water and water, respectively, in the state that the inner cylinder housing is fitted in the outer cylinder, the peripheral wall of the main portion having an opening for leading out combination water.

With the above means according to the present invention, the automatic water combination faucet is assembled by assembling the faucet body with the outer cylinder and the inner cylinder housing, which is formed separately from the outer cylinder by casting or molding of a synthetic resin or the like, insertion-assembling the mixing valve unit in the form of a cartridge obtaining by assembling a mixing valve mechanism and a thermo-mechanism to the inside of the faucet body, and fittedly connecting a cap accommodating an adjustment screw unit to the main portion of the inner cylinder housing.

The outer cylinder and inner cylinder housing are assembled and secured to each other by connecting the open end for leading in hot water and the open end for leading out combination water or the open end for leading in water, of the inner cylinder housing, with connecting portions or member to the assembling hole portion for assembling the connector for leading in hot water and the assembling hole portion for assembling the connector for leading out combination water, respectively, or to the assembling hole portion for assembling the connector for leading in water, of the outer cylinder which is formed by casting or molding a synthetic resin material or from a tubular material.

As has been described in the foregoing, with the automatic water combination faucet according to the present invention, the faucet body comprises, as separate parts, the outer cylinder with the cylindrical wall thereof having the assembling hole portions for assembling the connectors connected to the hot water and water supply lines, respectively, and also the assembling hole portion for assembling the connector for connecting the combination water outlet, and the inner housing accommodating the mixing valve unit, the inner cylinder housing being formed by casting or molding of a synthetic resin or like material and having, as integral and continuous portions, the main portion accommodating the mixing valve unit, the passage-defining portion in the form of a line for leading hot water to the main portion, and a passage-defining portion in the form of a line for leading in combination water, or a passage-defining portion in the form of a line for leading in water, the passage-defining portions having the respectively open ends to be aligned, with the inner cylinder housing fitted in the outer cylinder, to the respective assembling hole portions of the outer cylinder in an abutting relation to the portions. The main portion of the inner cylinder housing is assembled and secured to the outer cylinder by inserting the main portion into the outer cylinder and connecting the open ends to the assembling hole portions with the connecting portions or members and the cap is engagedly connected to the main portion, whereby the automatic water combination faucet is assembled. Thus, it is possible to facilitate the fabrication and assembling of the faucet while ensuring water-tightness very reliably.

Further, by fabricating, as the inner cylinder housing accommodating the mixing valve unit, two different ones of the right and left-hand arrangements with the dial provided at the right and left ends, respectively, two different automatic water combination faucets of the right and left-hand arrangements may be assembled by commonly using the outer cylinder.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
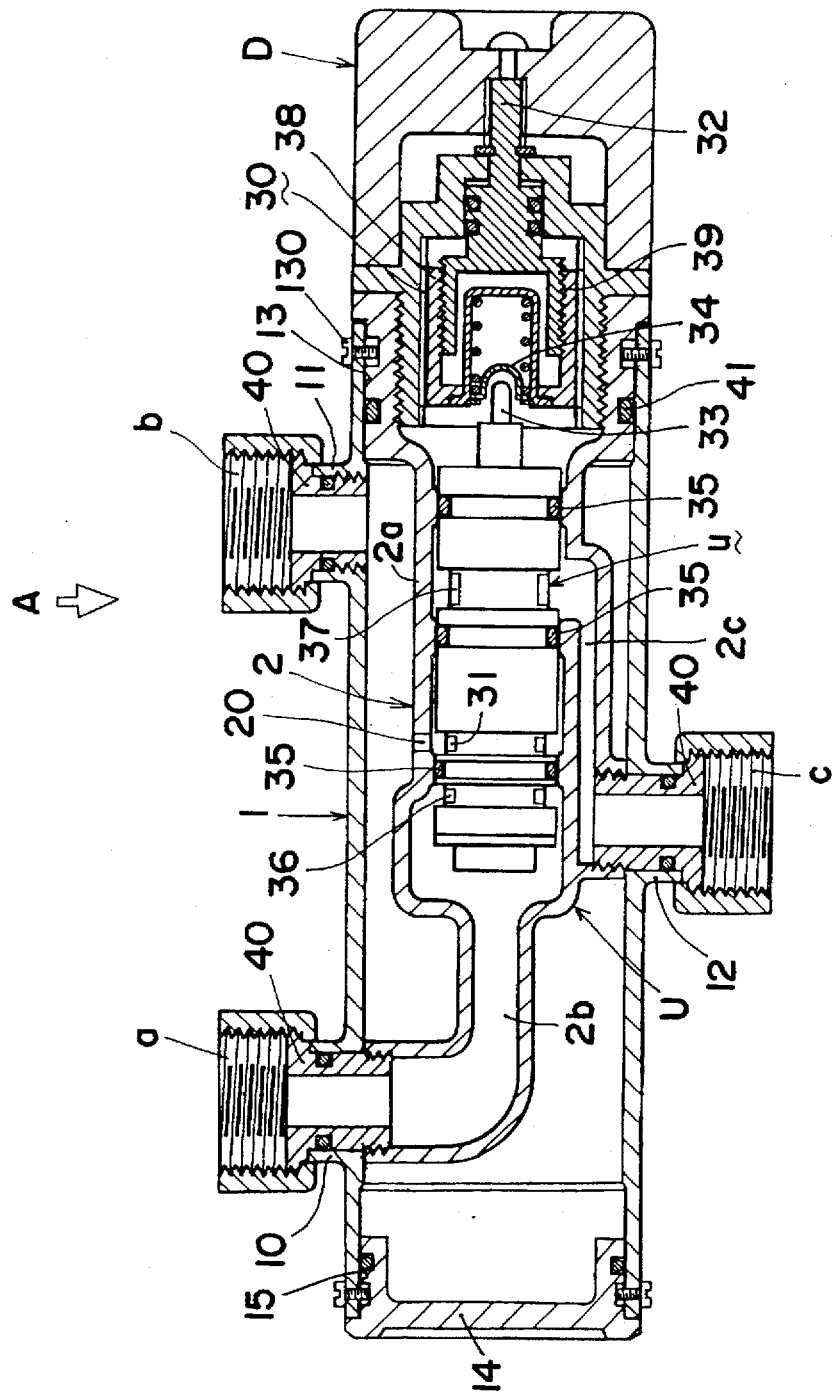
FIG. 1 is a cross-sectional view showing an automatic water combination faucet embodying the present invention.

FIG. 1 is a cross-sectional view showing an automatic water combination faucet A according to the present invention. Referring to the Figure, designated at 1 is an outer cylinder, at 2 an inner cylinder housing, u a mixing valve unit assembled in the inner cylinder housing 2, and D a control dial.

Figure 2:
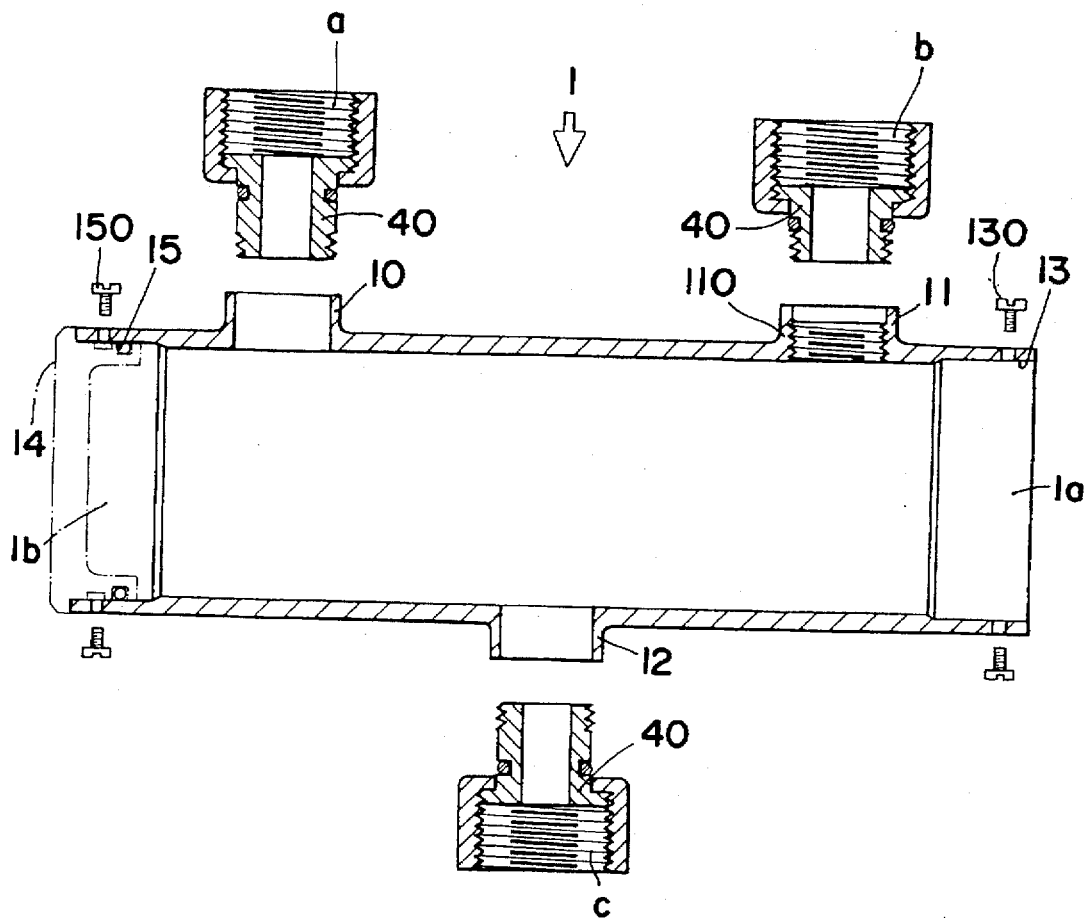
FIG. 2 is an exploded cross-sectional view showing an outer cylinder of the automatic water combination faucet.

The outer cylinder 1 is formed by casting or from a tubular material of metal. As shown in FIG. 2, it is in the form of a pipe open at the opposite ends in the axial direction. The back side of its cylindrical wall has assembling hole portions 10 and 11 formed as short, outwardly projecting cylindrical portions near the opposite ends. The assembling hole portion 10 is for assembling a connector a for leading in hot water. The assembling hole portion 11 is for assembling a connector b for leading in water. These assembling hole portions 10 and 11 are laterally symmetrical. The front side of the cylindrical wall of the outer cylinder 1 has a further assembling hole portion 12 formed also as a short, outwardly projecting cylindrical portion at an axially mid position. The assembling hole portion 12 is for assembling a connector c for leading out combination water. The outer cylinder 1 has an engagement portion 13 formed adjacent its right end for assembling the inner cylinder housing 2 which serves as a housing of the mixing valve unit u. It also has an engagement portion 15 which is like the engagement portion 13 and formed adjacent the left end for assembling a lid member 14.

Figure 3:
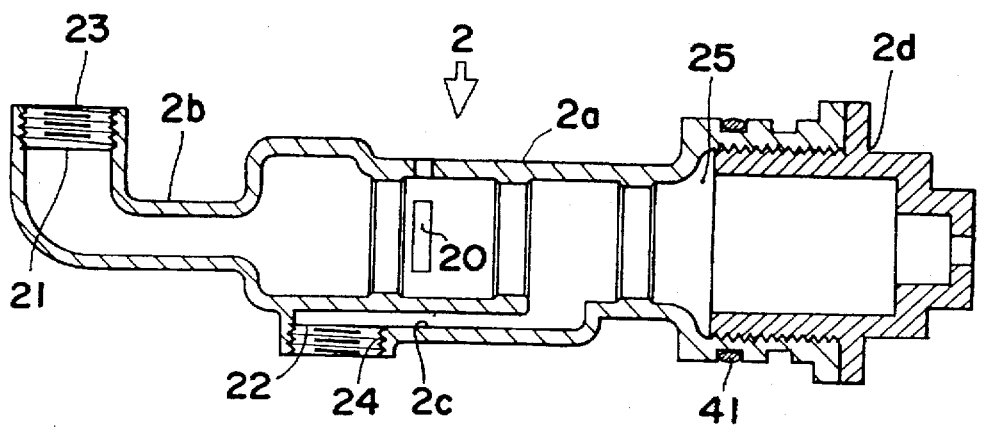
FIG. 3 is a cross-sectional view showing the same automatic water combination faucet.

The inner cylinder housing 2 serving as the housing of the mixing valve unit u, as shown in FIG. 3, has a cylindrical main portion 2a which accommodates the mixing valve unit u, a passage-defining portion 2b in the form of a line which is communicated with the connector a for leading in hot water, a passage-defining portion 2c in the form of a line which is communicated with a connector c for leading out combination water, and the cap 2d which accommodates an adjustment screw unit 30 of the mixing valve unit u and is screwed in a stem end of the main portion 2a of the inner cylinder housing 2.

The main portion 2a, the passage-defining portion 2b for hot water and the passage-defining portion 2c for combination water, are formed by casting such that they are unitary with and continuous to one another. The cap 2d is formed by casting such that it is separate from the above portions.

Figure 5:
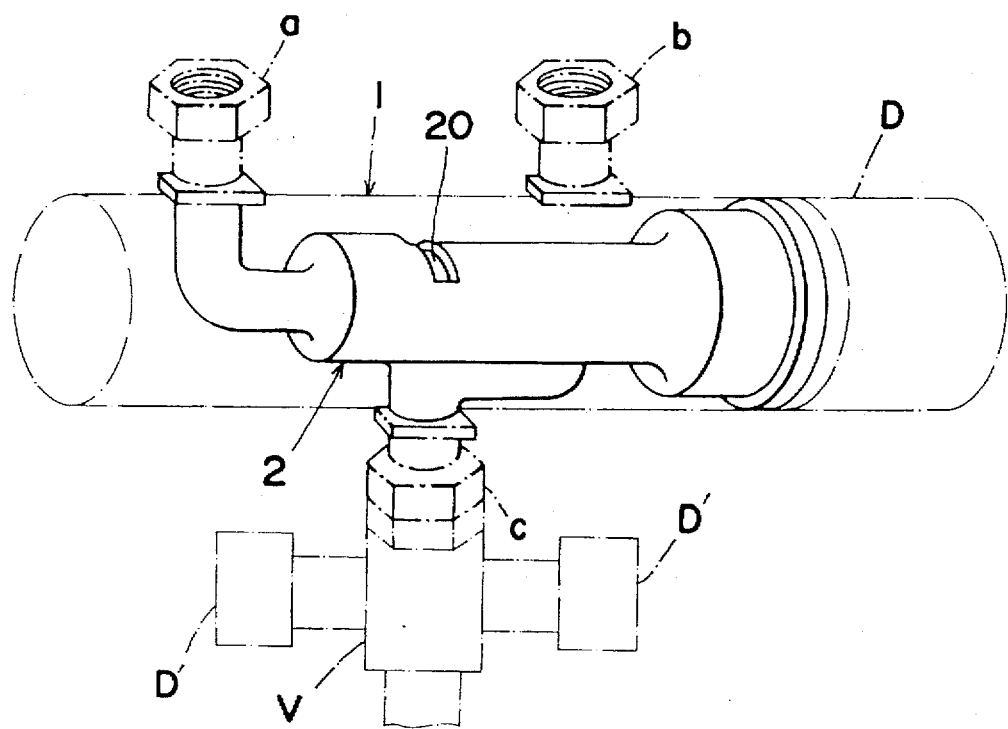
FIG. 5 is a perspective view, partly in imaginary line showing, of the same automatic water combination faucet.

The main portion 2a, as shown in FIG. 5, has an opening 20 in the form of a window formed at a position corresponding to a water inlet 31 of the mixing valve unit u inserted in the main portion.

The passage-forming portions 2b and 2c in the form of lines which are unitary with and continuous to the main portion 2a, have respective open ends 21 and 22. These open ends 21 and 22 have female threads 23 and 24, in which the connecting members 40 for assembling the connectors a and c are screwed.

The cap 2d which is screwed in the main portion 2a, accommodates the adjustment screw unit 30 of the mixing valve unit u fitted in the cap. The adjustment screw unit 30 has an adjustment shaft 32 projecting outward through an opening formed at the outer end of the cap 2d. With the control dial D assembled on the projecting portion of the adjustment shaft 32, the cap 2d is assembled to the main portion 2a by screwing its inner end portion in an outer open end portion 25 of the inner cylinder housing 2. At this time, the mixing valve unit u which has been assembled in the form of a cartridge, has been fitted in the main portion 2a with the adjustment screw unit 30 removed from the mixing valve unit so that an operating rod 33 for operating the mixing valve projects. By fitting the cap 2d in this state, an operating rod receiver 34, which is provided in the adjustment screw unit 30 assembled in the cap 2d, is engaged with the operating rod 33, whereby the assembling of the mixing valve unit is completed.

Figure 4:
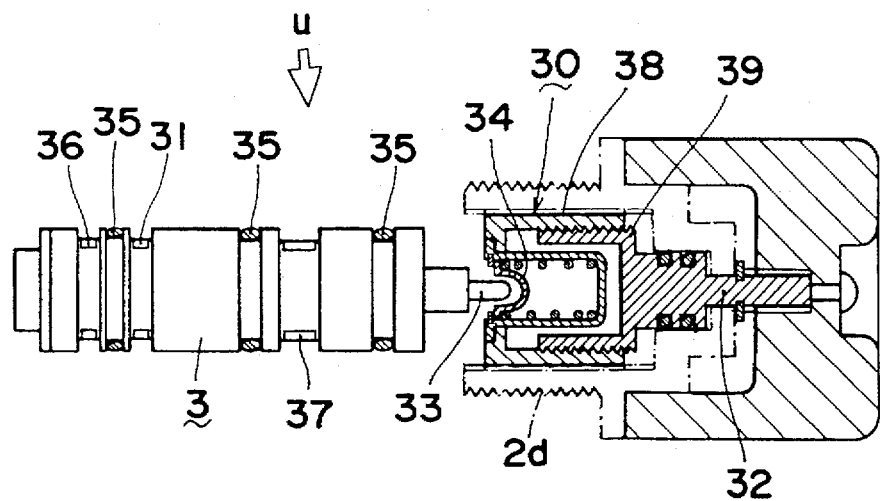
FIG. 4 is a plan view, partly in section, showing a mixing valve unit of the same automatic water combination faucet.

The mixing valve unit u, as shown in FIG. 4, includes a cylindrical case 3 which is fitted water-tight in the main portion 2a of the inner cylinder housing 2 through water-tight members 35. The case 3 accommodates a mixing valve mechanism and a thermo-mechanism assembled in the case. The case 3 has a hot water inlet 36, a water inlet 31 and a combination water outlet 37. The thermo-mechanism operates the operating rod 33 such that the rod 33 is projected and retreated from one end of the case 3. The adjustment screw unit 30 serves to set temperature as desired by changing the position, at which the end of the operating rod 33 is supported. The adjustment screw unit 30 is assembled from such parts as a cylindrical member 38 which is formed separately from the case 3, and an adjustment screw 39 which is integral with the adjustment shaft 32 screwed in the cylindrical member 38, as well as the operating rod receiver 34 assembled to the outer end of the cylindrical member 38 to receive the operating rod 33. By fitting the adjustment screw unit 30 in the cap 2d and then screwing the cap 2d in the main portion 2a, the unit 30 is assembled to the mixing valve mechanism and thermo-mechanism accommodated in the case 3, thus completing the assembling of the blending valve unit u.

For assembling the inner cylinder housing 2 with the mixing valve unit u assembled therein to the outer cylinder 1, the inner cylinder housing 2 is firstly inserted from its end on the side of the passage-defining portion 2b for hot water into the outer cylinder 1 from the right open end 1a thereof. Then, the open end 21 of the passage-defining portion 2b, of the inner cylinder housing 2, and the assembling hole portion 10 for leading in hot water, of the outer cylinder 1, are aligned in an abutting relation to each other, and the connector a is connected to the assembling hole portion 10 of the outer cylinder 1 such as to connect together the outer cylinder 1 and inner cylinder housing 2. Specifically, the connector a is connected from the outside by inserting the connecting member 40 through the assembling hole portion 10 and screwing it in a threaded portion 23 of the open end 21. Likewise, the open end 22 of the passage-defining portion 2c for leading out combination water, of the inner cylinder housing 2, and the assembling hole portion 12 for leading out combination water, of the outer cylinder 1, are aligned in an abutting relation to each other, and a connector c is connected to the assembling hole portion 12 from the outside such as to connect together the outer cylinder 1 and inner cylinder housing 2 by inserting the connecting member 40 through the assembling hole portion 12 and screwing it in a threaded portion 24 of the open end 22. Thus, the assembling and securing of the outer cylinder 1 and inner cylinder housing 2 to each other are completed.

In this state, an outer end portion of the main portion 2a of the inner cylinder housing 2 is screwed by set screws 130 to the engagement portion 13 of the outer cylinder 1 adjacent the open end 1a thereof. This screwing is made for the purpose of preventing the rotation of the inner cylinder housing 2 relative to the outer cylinder 1, but it may be dispensed with, that is, its role can be fulfilled, in that the outer cylinder 1 and the inner cylinder housing 2 are connected together by the connecting members 40 for connecting the connectors a and c and that the engagement of the inner cylinder housing 2 in the engagement portion 13 of the outer cylinder 1 is made through an O-ring 41 to secure water tightness.

When this assembling is ended, a lid member 14 is engaged water-tight in the engagement portion 15 of the outer cylinder 1 adjacent to the left open end 1b thereof and likewise screwed by set screws 150 to the outer cylinder 1.

Further, the connector b for leading in water is connected to the assembling hole portion 11 for leading in water, provided in the outer cylinder 1 near the right end thereof. That is, the connector b is connected by screwing the connecting member 40 in a threaded portion 110 formed on the inner surface of the assembling hole portion 11.

Figure 6:
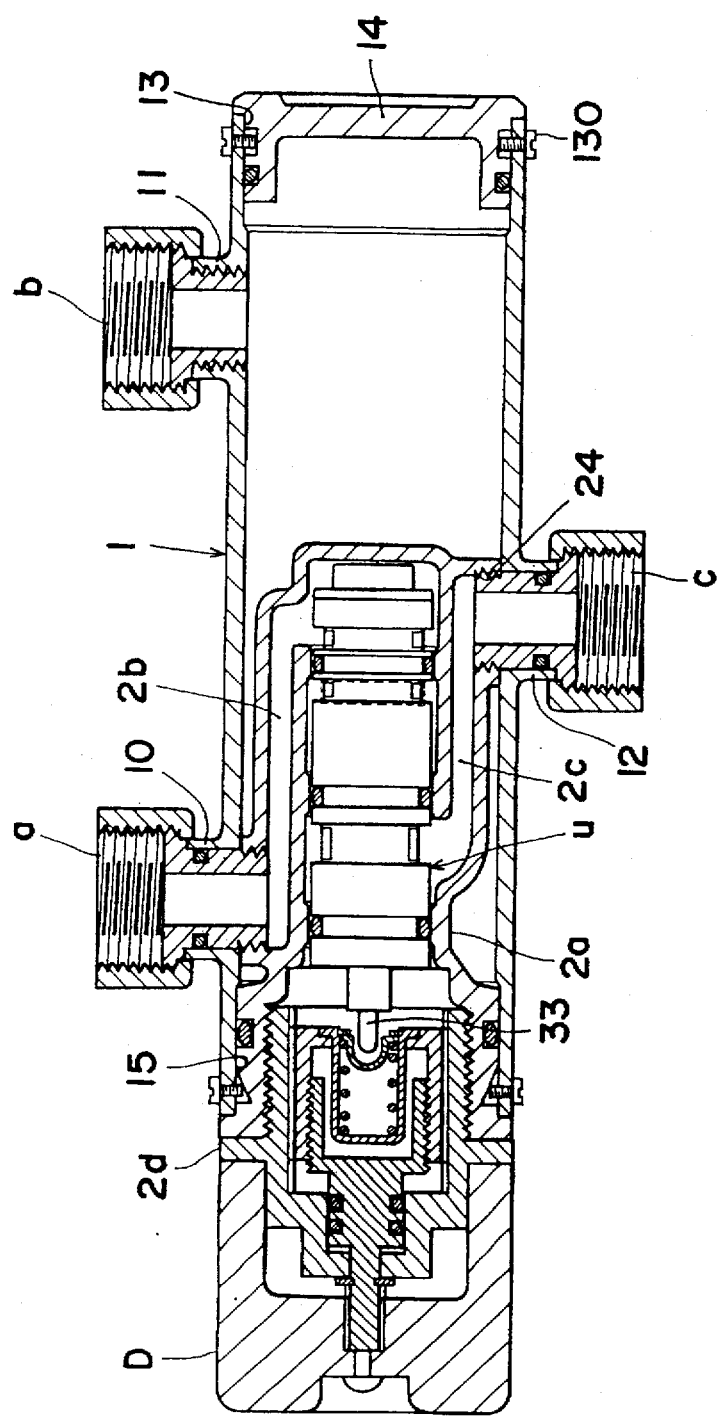
FIG. 6 is a cross-sectional view showing another embodiment of the automatic water combination faucet.

FIG. 6 shows an assembly of automatic water combination faucet A, in which a control dial D for operating the adjustment screw unit 30 of the mixing valve unit u is found at the opposite end, i.e., left end in the Figure, of the outer cylinder 1.

Figure 7:
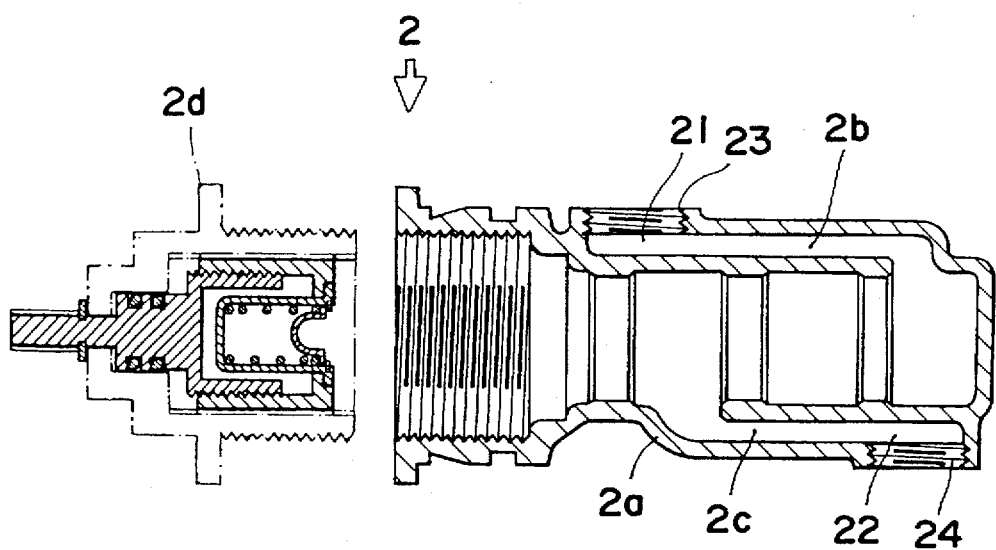
FIG. 7 is an exploded cross-sectional view, partly in imaginary line showing, of part of an inner cylinder housing of the same embodiment.

In this case, the inner cylinder housing 2 accommodating the mixing valve unit u has an arrangement as shown in FIG. 7. As shown, the passage-defining portion 2b for leading in hot water extends backward from the side of the inner end of main portion 2a to the outer end side thereof.

Figure 8:
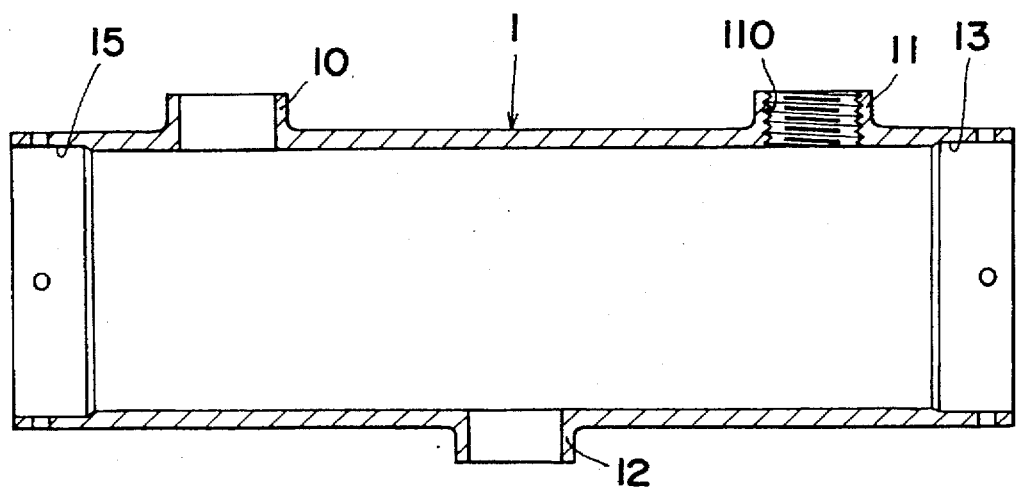
FIG. 8 is a cross-sectional view showing an outer cylinder of the same embodiment.
Figure 9:
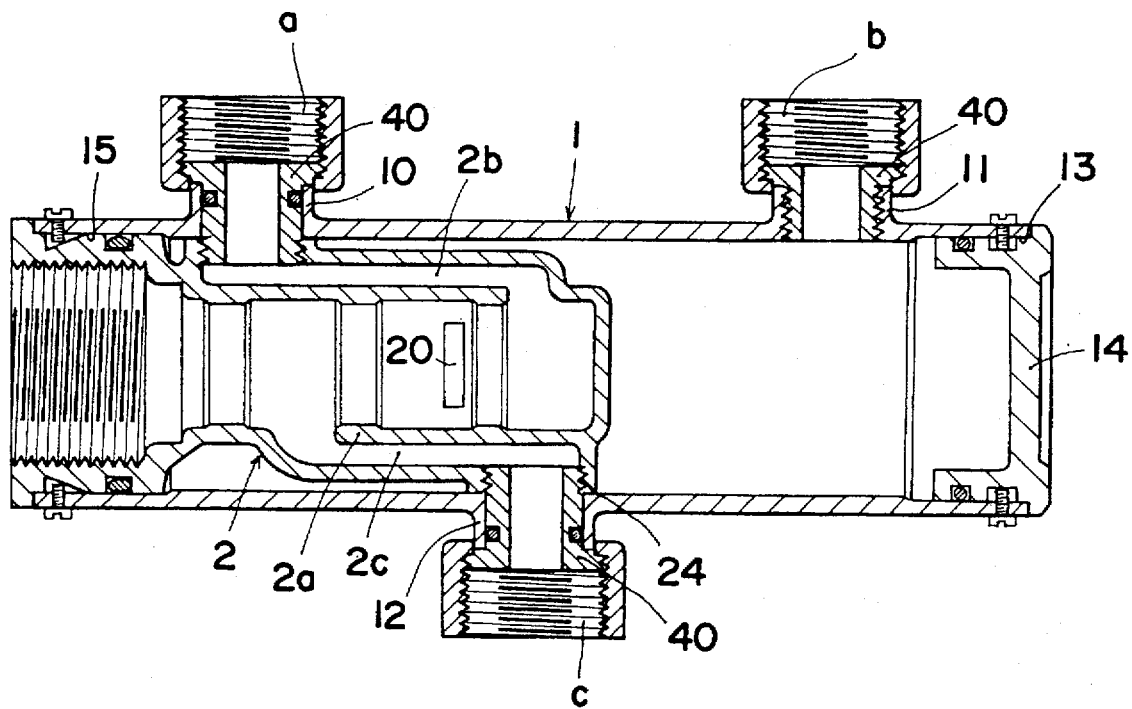
FIG. 9 is a cross-sectional view showing a state that a main portion of an inner cylinder housing of the same embodiment is assembled to an outer cylinder thereof.

This arrangement is for meeting a prescription that line provision work should be made such that the line for supplying hot water is on the left side and that for supplying water is on the right side. Thus, the outer cylinder 1, as shown in FIG. 8, is the same as in the previous embodiment as shown in FIG. 2. Two different inner cylinder housings 2, i.e., one as shown in FIG. 7 and the other as in the previous embodiment shown in FIGS. 1 to 5, are prepared to assemble two different fashions of automatic water combination faucet A for the right and left-hand arrangements by using the common outer cylinder. The inner cylinder housing 2 for the left-hand arrangement as shown in FIG. 7 is different from that for the right-hand arrangement as shown in FIG. 3 only in that the passage-defining portion 2b for hot water extends backward, and the mixing valve unit u accommodated in the housing 2 and assembling means with respect to the outer cylinder 1 are the same as in the previous embodiment. Like parts are thus designated by like reference numerals and symbols, and they are not described in detail.

Figure 10:
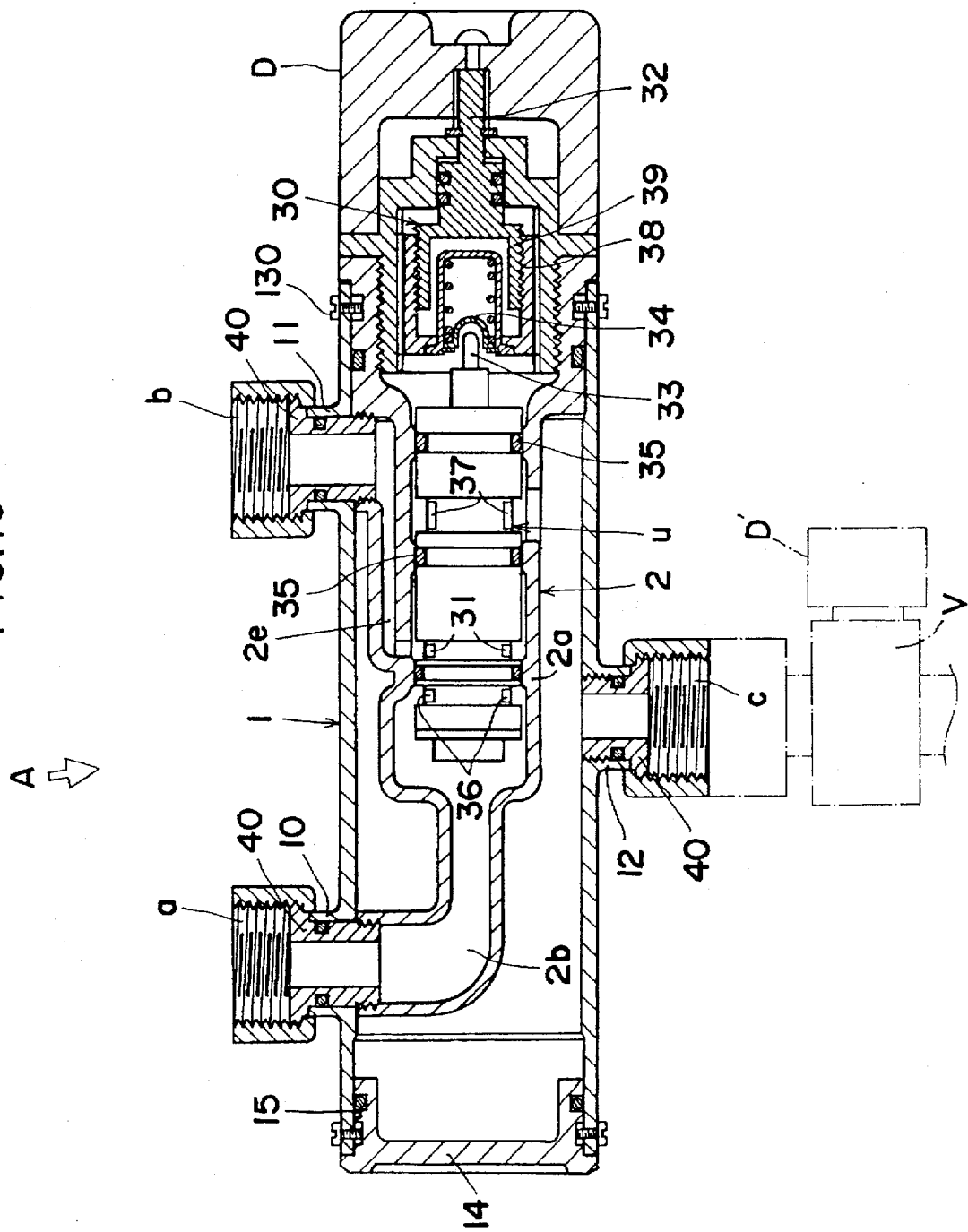
FIG. 10 is a cross-sectional view showing a further embodiment of the automatic water combination faucet.
Figure 11:
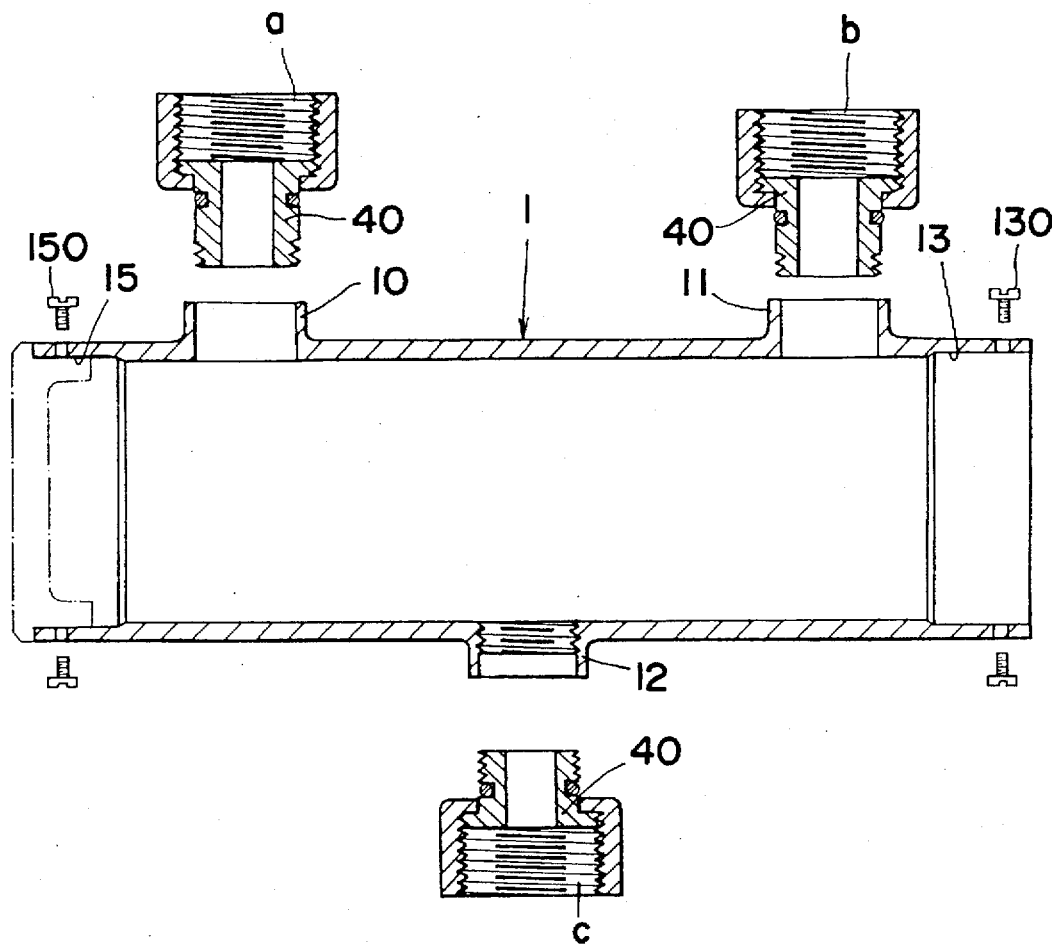
FIG. 11 is an exploded cross-sectional view showing an outer cylinder of the same embodiment.

FIG. 10 shows a further embodiment. In the previous embodiment, the jacket-like space that is defined between the outer cylinder 1 and inner cylinder housing 2 is utilized as a passage of water led in through the connector b assembled to the assembling hole portion 11 for leading in water of the outer cylinder 1. In contrast, in this embodiment, the jacket-like space is utilized as a combination water passage.

Figure 12:
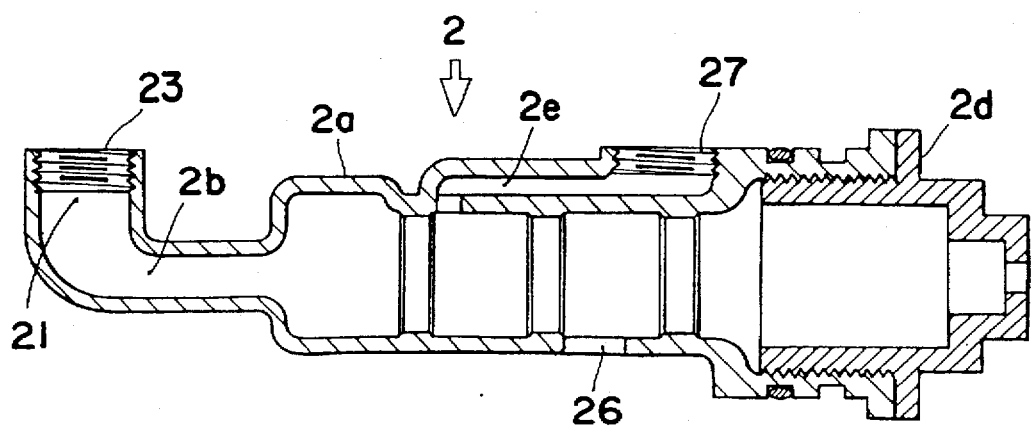
FIG. 12 is a cross-sectional view showing an inner cylinder housing of the same embodiment.

Specifically, as shown in FIG. 12, in this embodiment, the inner cylinder housing 2 accommodating the mixing valve unit u has, as unitary portions continuous to one another, a main body 2a, a passage-defining portion 2b in the form of a line for leading in hot water, and a passage-forming portion 2e in the form of a line for leading in water. The peripheral wall of the main portion 2a has an opening 26 for leading out combination water. The passage-defining portion 2e for leading in water has an open end 27, which is connected to the assembling hole portion 11 by screwing the connecting member 40, thus leading the led-in water straight through the passage-defining portion 2e into the main portion 2a. Also, combination water that led out through the combination water lead-out opening 26 formed in the peripheral wall of the main portion 2a is led out through the jacket-like space defined between the outer cylinder 1 and inner cylinder housing 2, the assembling hole portion 12 and the connector c assembled thereto to a combination water supply tap. The remainder of the structure is the same as in the previous embodiment.

In FIGS. 5 and 10, designated at V is a stopping/switching valve for stopping the supply of combination water from the combination water supply tap connected to the connector c assembled to the combination water take-out assembling hole portion 12 and switching shower and column, and D' a dial for causing these operations.

FIGS. 13 to 19 show a still further embodiment.

Figure 13:
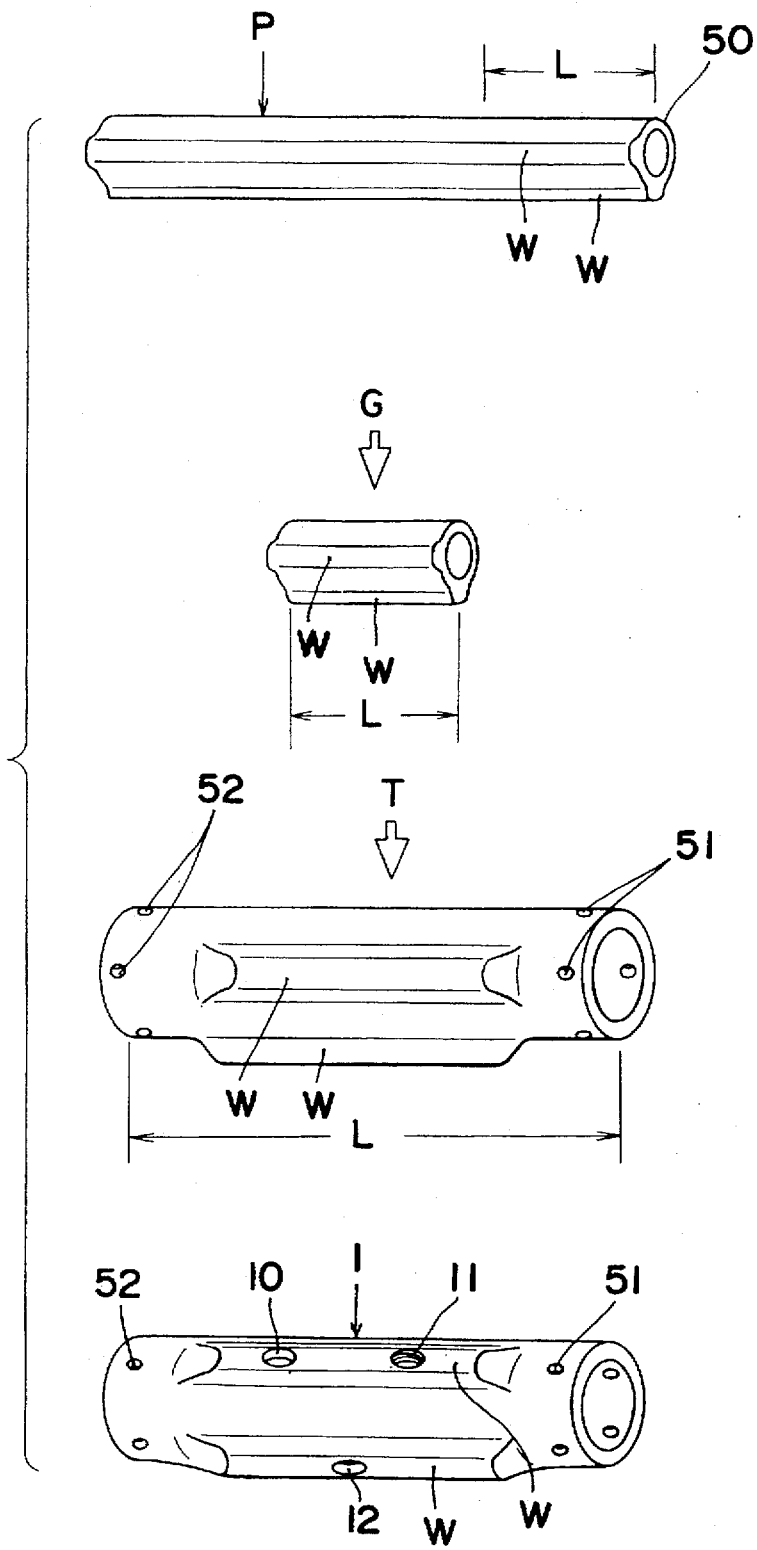
FIG. 13 is a view illustrating a process of fabricating an outer cylinder in a still further embodiment of the automatic water combination faucet according to the present invention.

FIG. 13 illustrates a process of fabricating the outer cylinder 1 in this embodiment. Referring to the Figure, designated at P is a longitudinally continuous elongate ridge-having pipe having a fixed sectional profile. Designated at G is an outer cylinder material which is obtained by cutting the ridge-having pipe P to a length size corresponding to the length of the outer cylinder 1 of the body of the automatic water combination faucet A to be manufactured. Designated at T is an intermediate product obtained by subjecting opposite end portions of the outer cylinder material G to a cutting process.

Figure 14:
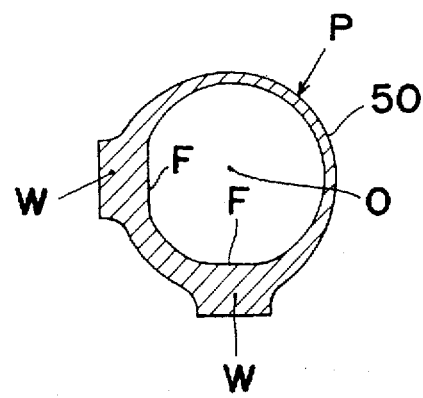
FIG. 14 is a longitudinal sectional view showing a deformed pipe for forming the same outer cylinder.
Figure 15:
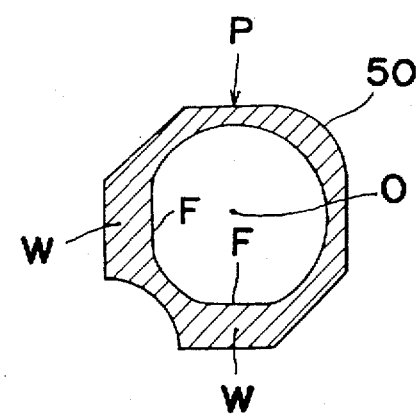
FIG. 15 is a longitudinal sectional view showing another embodiment of the deformed pipe for forming the same outer cylinder.

The ridge-having pipe P, as shown in FIG. 14, has two ridges or radially raised portions W formed on the rear part (i.e., left part in FIG. 14) and lower part of its peripheral wall. As referred to as such, the ridge-having pipe is longitudinally continuous with a sectional profile with the diameter thereof with respect to axis point 0 varied by the ridges W. The ridge W on the lower part of the peripheral wall 50 may be formed either on upper part or front part of the peripheral wall 50.

The ridge-having pipe P is formed by commonly termed continuous casting. More specifically, the continuous casting is made by using a pipe-like die having a molding surface having the sectional profile noted above. The die is held in a posture that its axis extends vertically. A plug-like member is provided in the die at an axially intermediate position thereof for vertical movement. Molten metal is poured into the die from the upper end thereof. When the poured molten metal is solidified, the plug member is displaced downward for displacing the cast metal such as to withdraw it downward. New molten metal is then poured onto the cast metal. The above sequence of operation is repeatedly executed, thus obtaining a longitudinally elongate continuous casting having a fixed sectional profile.

Further, it is possible to form the ridge-having pipe P as longitudinally continuous elongate member having a fixed sectional profile by a process of withdrawing or extruding bronze and aluminum alloy using a die having the sectional profile noted above.

When forming the ridge-having pipe P either by the continuous casting using the die as mentioned or by the process of withdrawing or extruding using a die, flat surfaces F are formed on the inner surface of the ridge-having pipe P such that they correspond to the ridges W.

Figure 16:
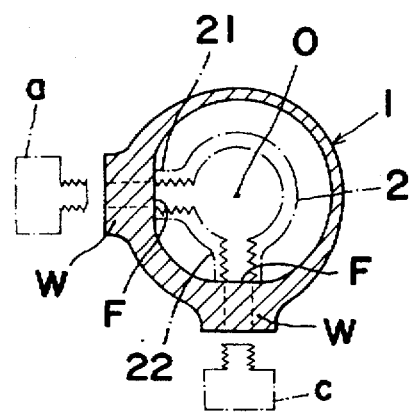
FIG. 16 is a view for explaining a function of the same outer cylinder.

The flat surfaces F facilitate a cutting process of forming the assembling hole portions 10 to 12 in predetermined portions of the ridges W of the outer cylinder material G, obtained by cutting the ridge-having pipe P to a predetermined length L corresponding to the length of the outer cylinder 1 as a final product. In addition, the assembling hole portions 10 to 12 thus formed each have a flat inner end surface. The assembling hole portions 10 to 12 thus can be reliably aligned, in an abutting relation of flat surfaces, to the open ends 20 to 22 of the inner cylinder 2, thus permitting a ready and reliable connecting process as shown in FIG. 16. The flat surfaces F are thus formed such that they are accurately perpendicular to the axes of the assembling hole portions 10 to 12 that are formed.

The outer cylinder material G, as described above, is formed by accurately cutting the ridge-having pipe P to a predetermined size corresponding to the length of the outer cylinder 1.

As shown in FIG. 13 noted above, the outer cylinder material G having been cut from the ridge-having pipe P, has opposite end portions of its outer periphery subjected to a cutting process to cut away opposite end portions of the ridges W. In addition, the resultant opposite end portions of the outer cylinder material G are processed to a circular or polygonal profile to meet an outer design of the body of the automatic water combination faucet A to be finished.

Further, the outer cylinder material G has opposite end portions of its inner periphery subjected to a cutting process of forming assembling portions 51 and 52 for assembling an outer end portion of the inner cylinder 2 formed separately and a lid member, respectively.

An intermediate product T is thus formed. Now, the assembling hole portions 10 to 12 are formed in the ridges W, thus completing the outer cylinder 1 as shown in FIG. 13.

Figure 17:
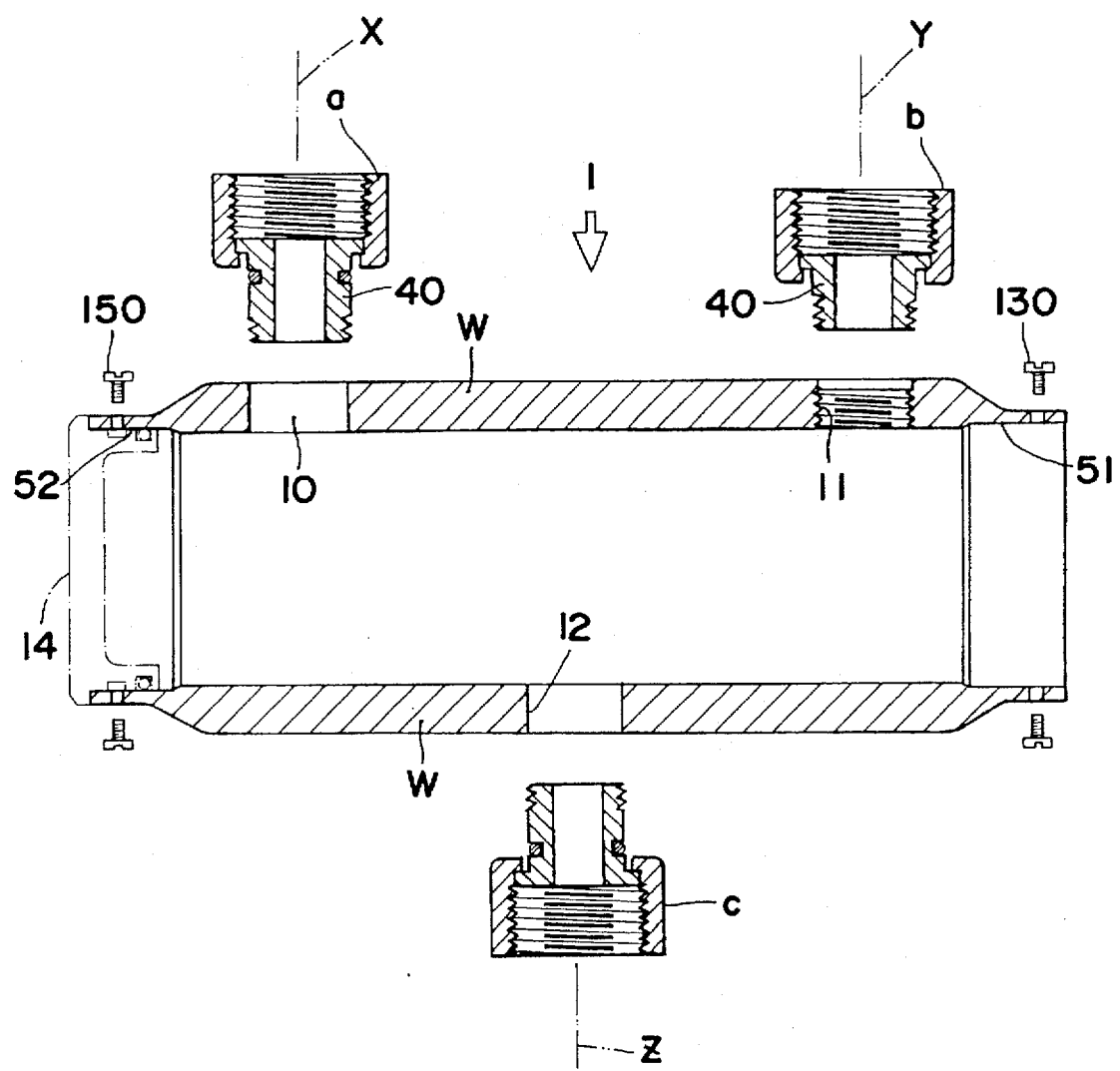
FIG. 17 is an exploded sectional view showing the same outer cylinder.

The assembling hole portions 10 and 11 are to face walls of a building when the assembled automatic water combination faucet A is installed. The assembling portions 10 and 11 are provided in the ridges W to serve as connecting sections for connecting hot water and water supply lines X and Y as shown in FIG. 17. The assembling hole 11 for connecting the water supply line Y is formed with a female thread which is meshed with a male thread provided on the inner end portion of the connecting member 40 of the connector b. The assembling hole portion 10 for connecting the hot water supply line X has an inner engagement surface, in which the barrel of the connecting member 40 of the connector a is engaged water-tight through the water-tight member.

The assembling hole portion 12 formed in the ridge W as the connecting section, which is positioned on the lower side of the faucet body for connecting a combination water lead-in line in the faucet installation work, like the assembling hole portion 10 noted above, formed in the ridge W for connecting the hot water supply line X, has an inner engagement surface for engaging water-tight the barrel of the connecting member 40 of the connector c.

Figure 18:
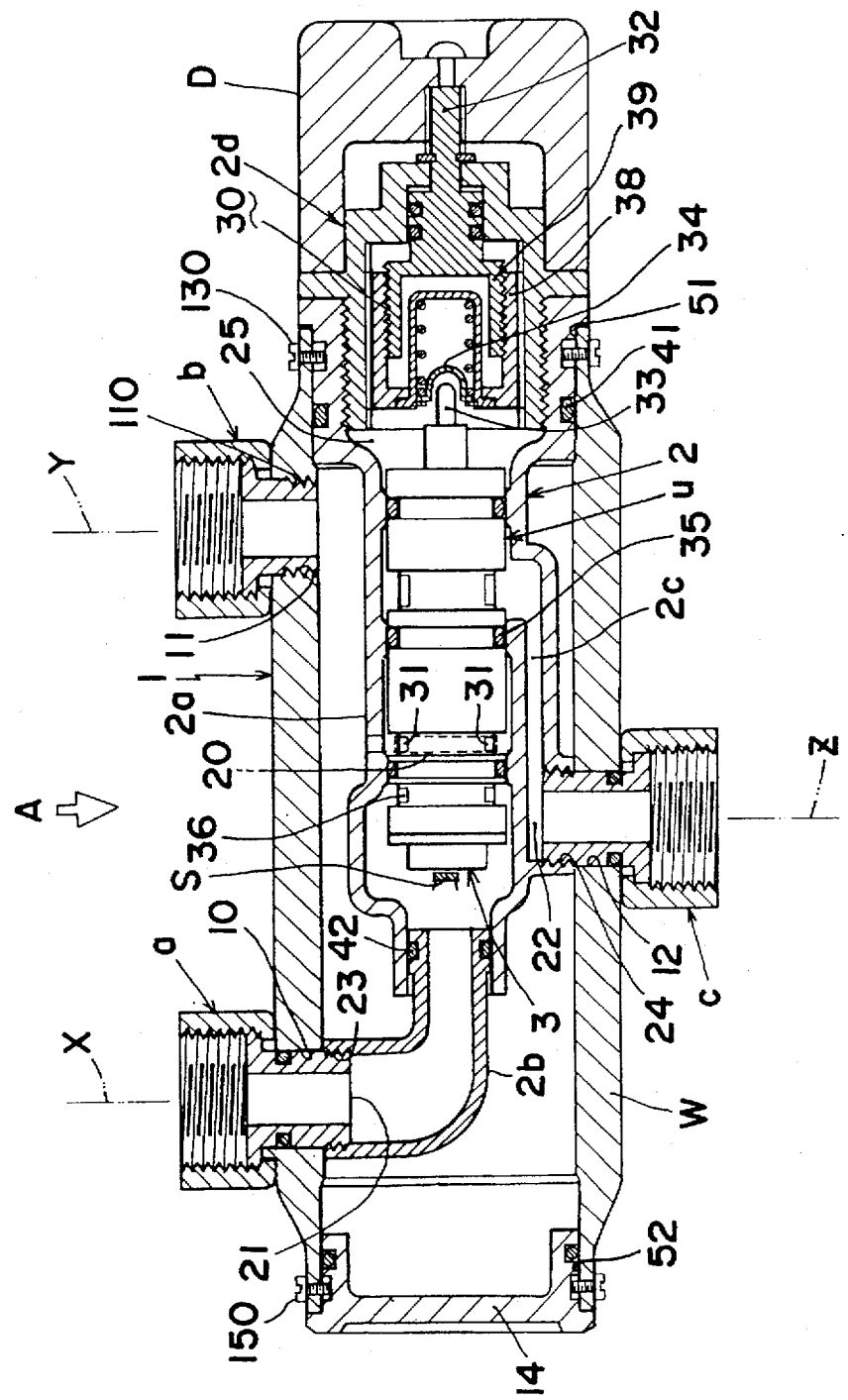
FIG. 18 is a longitudinal sectional view showing an automatic water combination faucet assembled by using the same outer cylinder.
Figure 19:
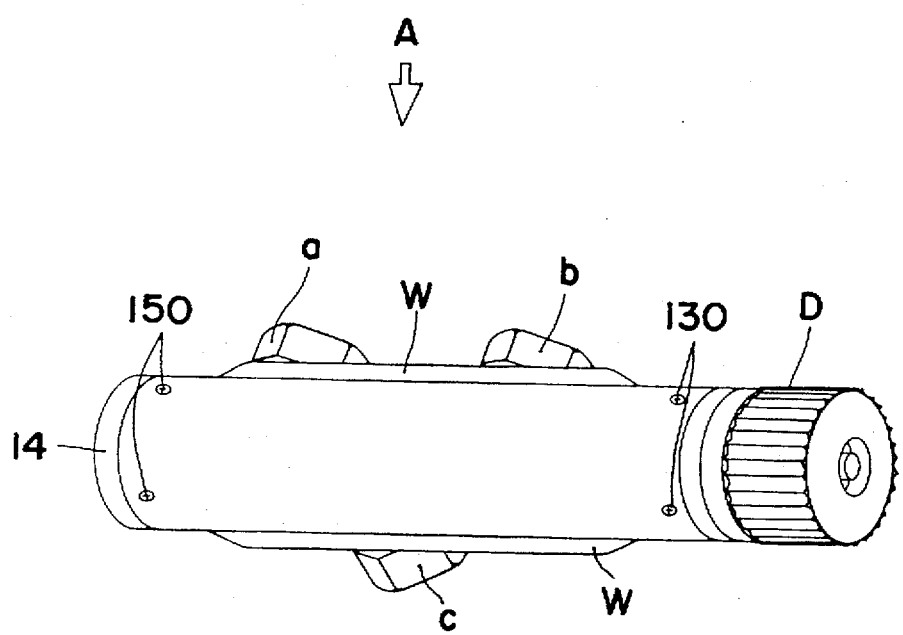
FIG. 19 is a perspective view showing the automatic water combination faucet by using the same outer cylinder.

The automatic water combination faucet A which has been assembled by using the above outer cylinder 1 shown in FIG. 17, is shown by the sectional view of FIG. 18. This automatic water combination faucet A is the same as the previous embodiment shown in FIGS. 1 to 3 insofar as it comprises the outer cylinder 1, the inner cylinder housing 2 insertion-assembled therein, and the mixing valve unit u assembled in the inner cylinder housing 2.

The inner cylinder housing 2 which accommodates the mixing valve unit u and is assembled in the outer cylinder 1 noted above, is the same as in the embodiment shown in FIG. 3, that is, it comprises a cylindrical main body 2a accommodating the mixing valve unit u, a passage-defining portion 2b in the form of a line communicated with the hot water lead-in connector a for leading in hot water, a passage-defining portion 2c in the form of a line communicated with the combination water lead-out connector c for leading out combination water, and a cap 2d accommodating an adjustment screw unit 30 of the mixing valve unit u and screwed in the stem end of the main portion 2a of the inner cylinder 2.

The main portion 2a, passage-defining portion 2b for hot water, and passage-defining portion 2c for combination water are formed by casting as integral and continuous portions. The cap 2d is formed separately from the main portion 2a and other portions by casting or like process from a resin or bronze. As an alternative, as shown in FIG. 18, the passage-defining portion 2b may be formed separately from the main portion 2a and assembled water-tight in the inner cylinder housing 2 through an O-ring 42.

The main portion 2a has an opening or window 20 formed at a position corresponding to the water inlet 31 of the mixing valve unit u inserted in the main portion. Further, its inner surface is formed with a stopper S, which is adapted to abut against the inner end of the mixing valve unit u to position the unit u at a predetermined position.

The passage-defining portions 2b and 2c which are integral with and continuous to the main portion 2a have respective open ends 21 and 22 having female threads 23 and 24 for screwing the connectors a and c therein.

The adjustment screw unit 30 of the mixing valve unit u is fitted in the cap 2d of the main portion 2a such that its adjustment shaft 32 projects through a hole formed in the outer end of the cap 2d. With the control dial D assembled on the adjustment shaft 32, the inner end of the cap 2d is screwed in an outer open end portion 25 of the inner cylinder 2. In this way, the cap 2d is assembled to the main portion 2a. At this time, the mixing valve unit u assembled into the form of a cartridge, is fitted with the adjustment screw unit 30 removed from the mixing valve unit in the main portion 2a such that the operating rod 33 for operating the mixing valve projects. By fitting the cap 2d, the operating rod receiver 34 fitted in the adjustment screw unit 30 assembled in the cap is engaged with the operating rod 33. In this way, the mixing valve unit u is assembled.

The mixing valve unit u has the same structure as in the previous embodiment.

Also, the inner cylinder housing 2 in which the mixing valve unit u is assembled, is assembled to the outer cylinder 1 in the same way as in the previous embodiment.

When the outer cylinder 1 and the inner cylinder housing 2 have been assembled together, the lid member 14 is engaged water-tight in the assembling portion 52 of the outer cylinder 1 adjacent to the left open end thereof, and screwed by set screws 150 to the assembling portion 52. The water lead-in connector b is inserted in the assembling hole portion 11 of the outer cylinder 1 provided near the right end thereof and assembled by screwing it in a female thread 110 formed in the inner surface of the assembling hole portion 11. In the above way, the automatic water combination faucet A is assembled.

FIGS. 20 to 23 show a further embodiment.

Figure 20:
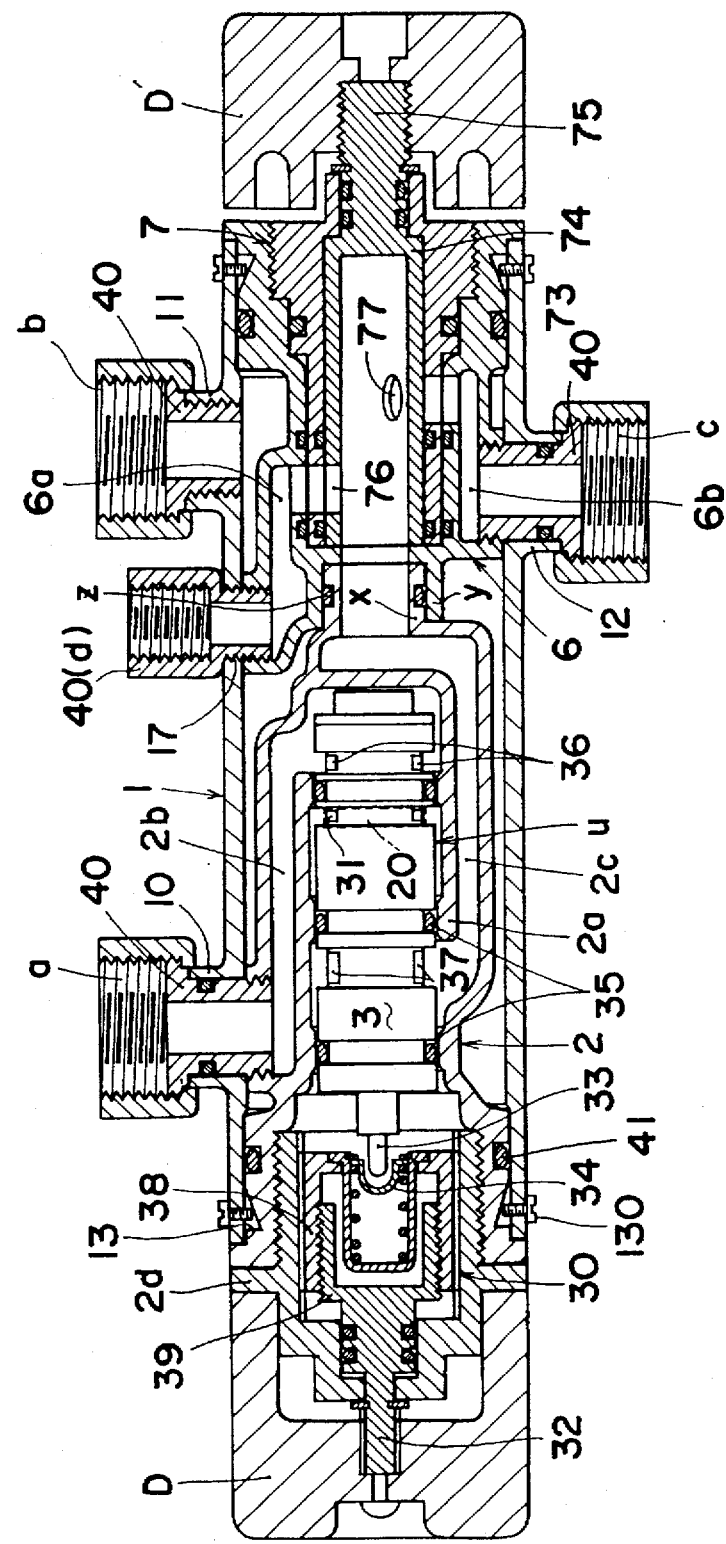
FIG. 20 is a cross-sectional view showing a yet further embodiment of the automatic water combination faucet according to the present invention.

FIG. 20 is a cross-sectional view showing an automatic water combination faucet A having been assembled. Referring to the Figure, designated at 1 is an outer cylinder, and at 2 an inner cylinder housing fitted in one end portion (i.e., left end portion in the Figure) of the outer cylinder 1. Designated at u is a mixing valve unit which is assembled into the form of a cassette by assembling a mixing valve mechanism and a thermo-mechanism in a case 3. Designated at 40 are connecting members. Designated at 6 is a second inner cylinder housing which is fitted in the other end portion (i.e., right end portion in the Figure) of the outer cylinder 1, and designated at 7 is a stopping/switching valve mechanism accommodated in the second inner cylinder housing 6. Designated at D is a control dial for temperature control, provided at one end of the outer cylinder 1, and at D' a stopping/switching dial provided at the other end of the outer cylinder 1.

Figure 21:
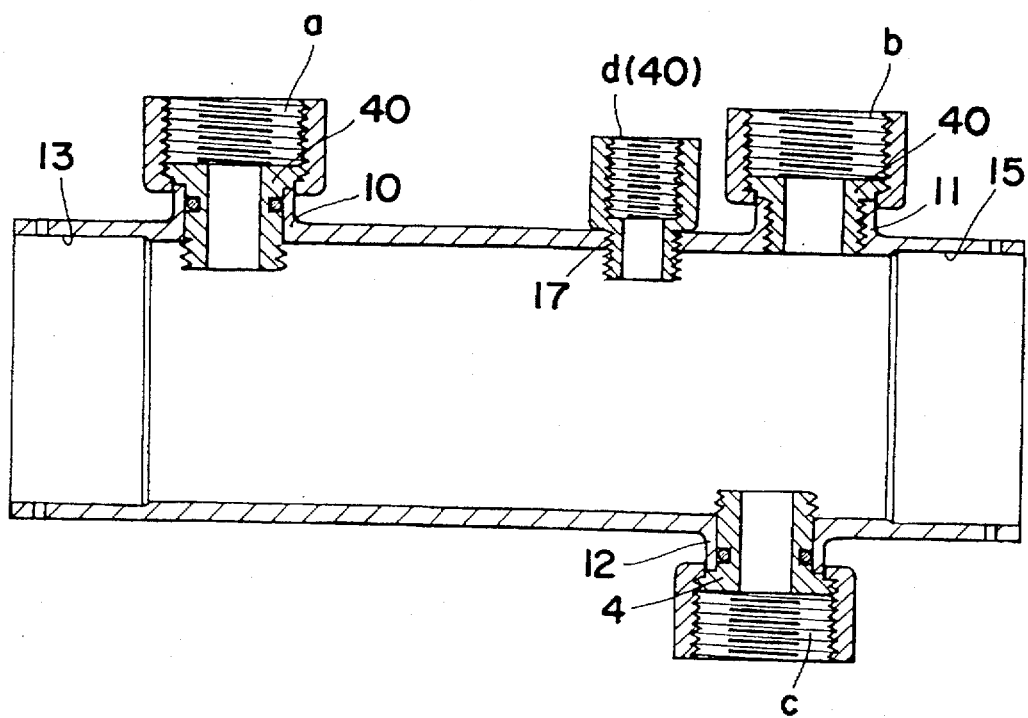
FIG. 21 is a cross-sectional view showing an outer cylinder of the same embodiment.

The outer cylinder 1 is formed by casting or from a tubular member of a metal. As shown in FIG. 21, it is in the form of a pipe and opens at the opposite axial ends. The back side of the cylindrical wall of the outer cylinder 1 has assembling hole portions 10 and 11 formed near its opposite ends. The assembling hole portion 10 is for assembling a hot water lead-in connector a. The assembling hole portion 11 is for assembling a water lead-in connector b. These assembling hole portions 10 and 11 are formed as short, outwardly projecting cylindrical portions and laterally symmetrical to each other. The outer cylinder 1 has a further assembling hole portion 17 formed as a similar cylindrical portion at a position intermediate between the assembling hole portions 10 and 11 and nearer the assembling hole portion 11. This assembling hole portion 17 is for assembling a shower connector d. The front side of the cylindrical wall of the outer cylinder 1 has a still further assembling hole portion 12 formed as a similar cylindrical portion at a position nearer the right end. The assembling hole portion 12 is for assembling a combination water lead-out connector c. The outer cylinder 1 further has engagement portions 13 and 15 formed adjacent to its opposite ends and having the same shape. The engagement portion 13 is for assembling the inner cylinder housing 2 accommodating the mixing valve unit u. The engagement portion 15 is for assembling the second inner cylinder housing 6 which accommodates the stopping/switching valve mechanism 7.

Figure 22:
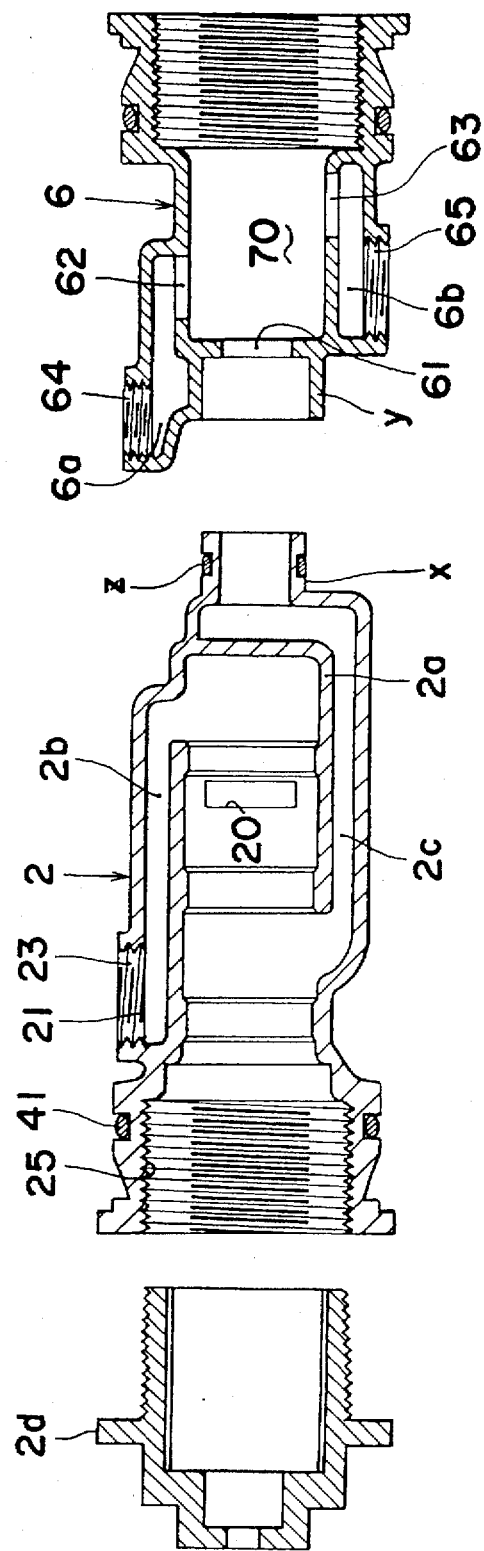
FIG. 22 is an exploded cross-sectional view showing an inner cylinder housing and a second inner cylinder housing of the same automatic water combination faucet.

The inner cylinder housing 2, as shown in FIGS. 20 and 22, has a cylindrical main portion 2a accommodating the mixing valve unit u, a passage-defining portion 2b in the form of a line which is communicated with the hot water lead-in connector a for leading in hot water, a passage-defining portion 2c in the form of a line which is communicated with the combination water lead-out connector c for leading out combination water, and a cap 2d which accommodates the adjustment screw unit 30 of the mixing valve unit u and is screwed in the stem end of the main portion 2a.

The main portion 2a and passage-defining portions 2b and 2c for hot water and water, are formed as integral and continuous portions by casting or molding of a synthetic resin or like material. The cap 2d is formed by casting separately from the main portion 2a and other portions.

The main portion 2a has an opening or window 20 formed at a position corresponding to the water inlet 31 of the mixing valve unit u inserted in the main portion.

Of the line-like passage-defining portions 2b and 2c which are integral with and continuous to the main portion 2a, the passage-defining portion 2b has an open end 21 having a female thread 23 for screwing the connecting member 40 of the connector a. The combination water lead-out passage-defining portion 2c has an end portion (i.e., downstream portion) led to be on the outer side of the inner end of the main portion 2a and formed with a joint portion x for leading out combination water therethrough.

The cap 2d screwed in the main portion 2a, accommodates the adjustment screw unit 30 of the mixing valve unit u fitted in the cap such that the adjustment shaft 32 of the unit 30 projects outward through a hole formed in the outer end of the cap. With the control dial D assembled on the adjustment shaft 32, the cap 2d is assembled to the main portion 2b by screwing the inner end portion of the cap in the outer portion 2a of the inner cylinder housing 2 from the open end 25 thereof. At this time, the mixing valve unit u assembled in the form of a cartridge is fitted with the adjustment screw unit 30 removed from the mixing valve unit so that the operating rod 33 for operating the mixing valve projects. By fitting the cap 2d in this state, operating rod receiver 34 provided in the adjustment screw unit 30 assembled in the cap is engaged with the operating rod 33 for assembling the mixing valve unit u. In this way, the mixing valve unit u is assembled. The mixing valve unit u is the same as in the previous embodiment shown in FIG. 1.

To assemble the inner cylinder housing 2 accommodating the mixing valve unit u to the outer cylinder 1, the main portion 2a of the inner cylinder housing 2 is firstly inserted from its end on the side of the passage-defining portion 2b for hot water into the outer cylinder 1 from one open end thereof. Then, the open end 21 of the passage-forming portion 2b is aligned in an abutting relation to the hot water lead-in assembling hole portion 10 of the outer cylinder 1, and the connector a is connected to the assembling hole portion 10 of the outer cylinder 1. The connector a is connected to connect together the outer cylinder 1 and inner cylinder housing 2 by screwing the connecting member 40 in the thread 23 formed in the open end 21. As a result of this assembling, the joint portion x at the end of the combination water lead-out passage-defining portion 2c adjacent to the inner end of the inner cylinder housing 1 projects to the right along the axis of the outer cylinder 1.

In this state, an outer end portion of the main portion 2a of the inner cylinder housing 2 is engaged from the outside in the engagement portion 13 of the outer cylinder 1 adjacent the left open end thereof and screwed by set screws 130 to the outer cylinder 1. This screwing may be dispensed with in that the inner cylinder housing 2 is prevented from rotation with respect to the outer cylinder 1 by the connecting member 40 connecting the connector a and effecting the connection of the outer cylinder 1 and inner cylinder housing 1 to each other and the O-ring 41 for water-tight engagement between the engagement portion 13 of the outer cylinder 1 and the inner cylinder housing 2.

Figure 23:
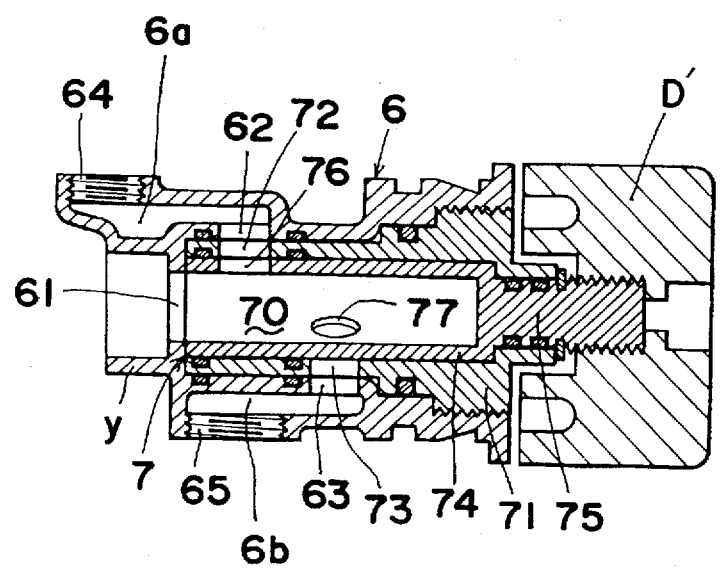
FIG. 23 is a cross-sectional view showing a stopping/ switching valve mechanism of the same automatic water combination faucet.

The second inner cylinder housing 6 which is fitted in the other end (i.e., right end in the Figure) of the outer cylinder 1, is formed by casting or molding from a synthetic resin or like material. As shown in FIGS. 22 and 23, it is cylindrical in shape and accommodates the stopping/switching valve mechanism 7 noted above. Its inner end is provided with a connecting portion y which is engagedly connected to the joint portion x provided at the inner end of the inner cylinder housing 2 noted above. The connecting portion y is communicated through an opening 61 with a valve chamber 70 of the stopping/switching valve mechanism 7 formed in the second inner cylinder housing 6.

Then, the inner cylinder housing 2 accommodating the mixing valve unit u is inserted into the outer cylinder 1 from the left end thereof, and at its predetermined position it is assembled and secured to the outer cylinder 1. In this state, the second inner cylinder housing 6 accommodating the stopping/switching valve mechanism 7 is inserted into the outer cylinder 1 from the right end thereof, and at its predetermined position it is assembled and secured to the outer cylinder 1. Thus, the joint portion x and connecting portion y are engaged with each other, and the combination water lead-out passage-defining portion 2c of the inner cylinder 2 accommodating the mixing valve unit u is communicated with the valve chamber 70 of the stopping/switching valve mechanism 7. The engagement between the joint portion x and connecting portion y is made water-tight by an intervening water-tight member z.

The stopping/switching valve mechanism 7, as shown in FIG. 23, has outlets 72 and 73 for shower and column, respectively. The outlets 72 and 73 are formed in the cylindrical wall of a cylindrical mounting portion 71, which is screwedly assembled in the second inner housing 6, such that they are shifted in circumferential and axial directions. The mechanism 7 further has a cylindrical valve body 74 which is inserted in the mounting cylinder 71 for rotation caused by an integral valve shaft 75. The cylindrical valve body 74 has its cylindrical wall formed with valve openings 76 and 77, which are alternately and switchedly communicated with the outlets 72 and 73 with the rotation of the valve body 74.

Specifically, when the valve opening 76 is aligned to the outlet 72 by rotating the stopping/switching control dial D' provided on the valve shaft 75 at the outer end thereof, combination water that is led to the valve chamber 70 is allowed to flow out through the outlet 72. When the valve opening 77 is aligned to the outlet 73, combination water in the valve chamber 70 is allowed to flow out through the outlet 73. In the rotational positions of the valve openings 76 and 77 shifted from both of the outlets 72 and 73, water is blocked by the peripheral wall of the valve body 74.

The outer periphery of the second inner cylinder housing 6 accommodating the stopping/switching valve mechanism 7, has integral and continuous branch passage-defining portions 6a and 6b in the form of lines. The branch passage-defining portion 6a is for shower, and it has a stem portion communicated through an opening 62 with the outlet 72. The other branch passage-defining portion 6b is for column, and its stem portion is communicated through an opening 63 with the outlet 73. These branch passage-defining portions 6a and 6b have respective open ends 64 and 65 for assembling the connectors a and b for shower and a tap, respectively.

The second inner cylinder housing 6 in its state inserted in the outer cylinder 1 is assembled and secured to the outer cylinder 1 by aligning the open ends 64 and 65 of the branch passage-defining portions 6a and 6b for shower and the tap, respectively, in the assembling hole portions 12 and 17 of the outer cylinder 1 in an abutting relation to the portions 12 and 17 and screwing connecting members 40. The connecting member 40 in the assembling hole portion 17 for shower may also serve as the connector d.

What is claimed is:

1. An automatic water combination faucet comprising:

an outer hollow body (1) having a cold water inlet hole (11) to be connected to a cold water line, a hot water inlet hole to be connected to a hot water line, a mixed water outlet (12) to be connected to a mixed water line, and opposite open end portions (1a, 1b);

a mixing valve unit (u) for mixing cold water and hot water in a predetermined mixinq ratio;

an inner body (2) fitted in the outer hollow body (1), said inner body (2) having an inner chamber for receiving the mixing valve unit (u), a first pipe (2b) having one end communicated with the hot water inlet hole (10) and the other end communicated with the inner chamber, and a second pipe (2c, 2e) having one end communicated with one of the cold water inlet hole (11) or the mixed water outlet hole (12) and the other end communicated with the inner chamber;

an annular chamber formed between the outer hollow body (1) and the inner body (2), said annular chamber being communicated with the other of the cold water inlet hole (11) or the mixed water outlet hole (12);

said inner body (2) further having a communication hole (20, 26) for communicating the annular chamber with the inner chamber, and a connecting portion fixed to one of the open end portions (1a, 1b) of the outer hollow body (1) so that one side of the annular chamber is closed;

a lid member (14) fixed to the other of the open end portions (1a, 1b) of the outer hollow body (1) for closing the other side of the annular chamber; and an operating dial (D) fixed to the connecting portion of the inner body (2) for controlling the mixing ratio of the mixing valve unit (u);

further comprising an additional outlet hole (17) formed in the outer hollow body (1), a third pipe (6a) for communicating the one end of the second pipe (2c) with the additional outlet hole (17), a fourth pipe (6b) for communicating the one end of the second pipe (2c) with the mixed water outlet hole (12), and a switching valve (74) for alternatively communicating one of the third pipe (6a) and the fourth pipe (6b) with the second pipe (2c).

2. A faucet according to claim 1, wherein a switching dial (D') for operating the switching valve (74) is provided at the lid member (14).

* * * * *